(12) United States Patent
Wang et al.

(10) Patent No.: US 7,714,299 B2
(45) Date of Patent: May 11, 2010

(54) PARTICLE DETECTOR

(75) Inventors: Yi-Sheng Wang, Taipei (TW);
Shang-Ting Tsai, Sanchong (TW)

(73) Assignee: Academia Sinica, Nankang, Taipei (TW)

( * ) Notice: Subject to any disclaimer, the term of this patent is extended or adjusted under 35 U.S.C. 154(b) by 148 days.

(21) Appl. No.: 11/501,142

(22) Filed: Aug. 8, 2006

(65) Prior Publication Data
US 2008/0035855 A1 Feb. 14, 2008

(51) Int. Cl.
*H01J 37/244* (2006.01)
(52) U.S. Cl. ........................... 250/397; 250/283
(58) Field of Classification Search ............ 250/397, 250/283, 287
See application file for complete search history.

(56) References Cited

U.S. PATENT DOCUMENTS

| | | | | |
|---|---|---|---|---|
| 3,579,270 A * | 5/1971 | Daly et al. | ............ | 250/282 |
| 4,136,280 A * | 1/1979 | Hunt et al. | ............ | 250/292 |
| 4,398,090 A * | 8/1983 | Eloy et al. | ............ | 250/299 |
| 4,841,143 A * | 6/1989 | Tamura et al. | ............ | 250/288 |
| 5,223,711 A * | 6/1993 | Sanderson et al. | ............ | 250/281 |
| 5,614,711 A * | 3/1997 | Li et al. | ............ | 250/287 |
| 2007/0210248 A1* | 9/2007 | Koo et al. | ............ | 250/287 |

* cited by examiner

*Primary Examiner*—Kiet T Nguyen
(74) *Attorney, Agent, or Firm*—Cohen Pontani Lieberman & Pavane LLP

(57) ABSTRACT

A particle detector for detecting a particle beam includes a negatively charged electrode plate having a first side facing the particle beam, a second side opposite to the first side, and a through-hole extending from the first side to the second side for receiving the particle beam. A detection device adjacent to the second side of the electrode plate detects signals corresponding to the particle beam approaching the through-hole.

19 Claims, 5 Drawing Sheets

PARTICLE DETECTOR

BACKGROUND OF THE INVENTION

1. Field of the Invention

The present invention refers to a particle detector, especially to a particle detector for detecting positive or negative ions.

2. Description of the Related Art

Such detectors have been used in many fields of technology. In particular, ion detectors are used in mass spectrometry.

Conventionally, electrically charged particles may be detected by a traditional ion detector, the most well-known one of which is a scintillation detector usually called "Daly detector". A conventional Daly detector is described in N. R. Daly, "Scintillation type mass spectrometer ion detector", Review of Scientific Instruments, Vol. 31 No. 3, 264-267, March 1960. This conventional detector assembly consists of a −40 kV high voltage conversion dynode and an aluminum-plated scintillating layer equipped with a photomultiplier tube (PMT). The surfaces of the conversion dynode and the scintillating layer face each other. While entering the detection region in a direction parallel to the surface of the dynode, positive ions are deflected and accelerated towards the surface of the conversion dynode by the strong electric field and eject secondary electrons while impinging on the dynode surface. The ejected electrons, because of the strong repulsion Coulombic force of the conversion dynode, will accelerate towards the low potential scintillation layer and induce luminescence for PMT detection. However, the Daly detector is generally only used for detecting positively charged particles but not for negatively charged particles due to the negative electric polarity of the conversion dynode.

In order to apply scintillation-type detectors to anion detection, it has been proposed in A. Pramann et al., "A new scintillation-type time-of-flight anion detector", Review of Scientific Instruments, Vol. 72 No. 8, 3475-3476, August 2001, to use an arrangement of two metal grids to generate the secondary electrons. Both grids are arranged perpendicularly to the direction of the anion beam. The first grid is electrically grounded, whereas the second grid, which serves as a conversion dynode, is biased at +2 kV. When entering the area between the two grids, the anions are accelerated onto the second grid, where the secondary electrons are generated. Behind the second grid, a highly positively biased scintillating surface is arranged which attracts and detects the secondary electrons. Although this detector can detect anions, the application of this type of scintillating detector is mainly limited by its sensitivity and mass working-range (<1,000 m/z in all literature reports). Moreover, no literature reports the detection of cations by using this detector.

A combined cation and electron detector has been disclosed in U.S. Patent Application Publication 2004/0262531 A1. This detector consists of several charged plates which are arranged in parallel to each other and in parallel to the initial beam path as well as a scintillator located behind the plates and biased at +10 kV. Alternatively, the charged plates can be replaced by a charged cylinder. In the cation detection mode, the charged plates or the cylinder are biased at −2 kV, which attracts the cations and results in the generation of secondary electrons when the cations impinge on the surface. The secondary electrons are then accelerated towards the scintillator. In the electron detection mode, the charged plates or the cylinder are biased at +500 V. Although some electrons might strike the plates or cylinder, the majority of them pass through and impinge on the scintillator directly. However, a detection of heavier anions is not disclosed.

Thus, a particle detector which can detect both positive and negative ions without any change in detector condition has not been proposed and is highly desirable.

SUMMARY OF THE INVENTION

It is an object of the present invention to provide a particle detector which can detect both positive and negative ions without any change in detector condition. It is a further object of the present invention to provide a flexible particle detector having good detection sensitivity and mass working-range. Further, it is another object of the present invention to provide a detector which can be operated under various vacuum conditions.

According to a preferred embodiment of the present invention, the particle detector for detecting a particle beam comprises a negatively charged electrode plate having a first side facing the particle beam, a second side opposite to the first side, and a through-hole extending from the first side to the second side for receiving the particle beam. A detection device adjacent to the second side of the electrode plate detects signals corresponding to the particle beam approaching the through-hole.

According to a preferred embodiment of the present invention, the detection device comprises a scintillator having a scintillating layer.

According to a preferred embodiment of the present invention, the detection device further comprises a photomultiplier tube or a video camera for receiving the light emitted by the scintillator.

The scintillator can be coated by a layer of conductive material.

Alternatively, the detection device can be a microchannel plate (MCP), an electron multiplier, or an electric current collector.

According to a preferred embodiment of the present invention, the particle detector further comprises a metal mesh arranged in the area of the through-hole.

Preferably, the particle detector further comprises a cylindrical, electrically grounded tube extending from a particle beam generating device towards the through-hole, and a focusing device for focusing the particle beam. The focusing device can comprise an electrostatic lens set.

According to another preferred embodiment of the invention, the particle detector for detecting a particle beam comprises a negatively charged electrode plate having a first side facing the particle beam, a second side opposite to the first side, and a through-hole extending from the first side to the second side for receiving the particle beam; a particle guiding device which extends through the through-hole of the electrode plate; and a detection device adjacent to the second side of the electrode plate for detecting signals corresponding to the particle beam approaching the through-hole.

The particle guiding device preferably extends along a central axis of the particle detector.

The particle guiding device has a potential, which may be either less negative than the negative potential of the negatively charged electrode plate, grounded, or slightly positive.

The particle guiding device may comprise a wire, a rod or a tube, and may be made of an electrically conducting material or an electrically insulating material.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

DETAILED DESCRIPTION OF THE PRESENTLY PREFERRED EMBODIMENTS

Figure 1:
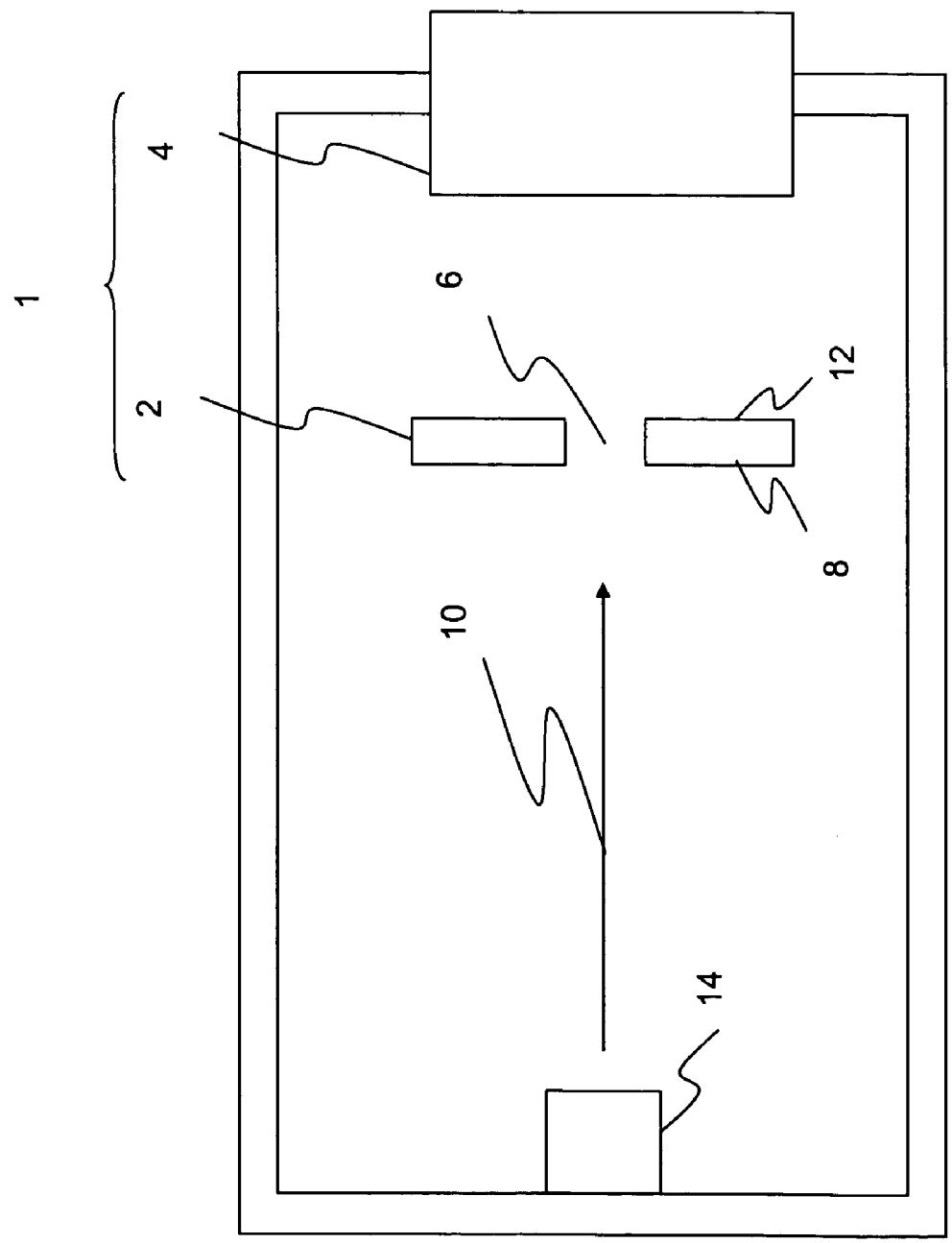
FIG. 1 is a schematic block diagram of a preferred embodiment of the particle detector according to the present invention.

FIG. 1 is a schematic block diagram of a preferred embodiment of the particle detector according to the present invention. Referring to FIG. 1, the particle detector 1 comprises a negatively charged electrode plate 2 and a detection device 4. The negatively charged electrode plate 2 comprises a through-hole 6 extending from a first side 8 (facing a particle beam 10) to a second side 12 (opposite to the first side 8) of the electrode plate 2. The negatively charged electrode plate 2 forms an electric field around the through-hole 6. The detection device 4 is adjacent to the second side 12, and when the particle beam 10 approaches the through-hole 6 and flies into the electric field, a signal can be detected by the detection device 4.

The particle beam source 14 for generating the particle beam 10 may be any kind of particle beam source that can generate positively or negatively charged particles, or even metastable neutrals. For example, the particle beam source 14 may be a matrix-assisted laser desorption/ionization (MALDI) source, a surface enhanced laser desorption/ionization (SELDI) source, or an electrospray ionization source.

Figure 2:
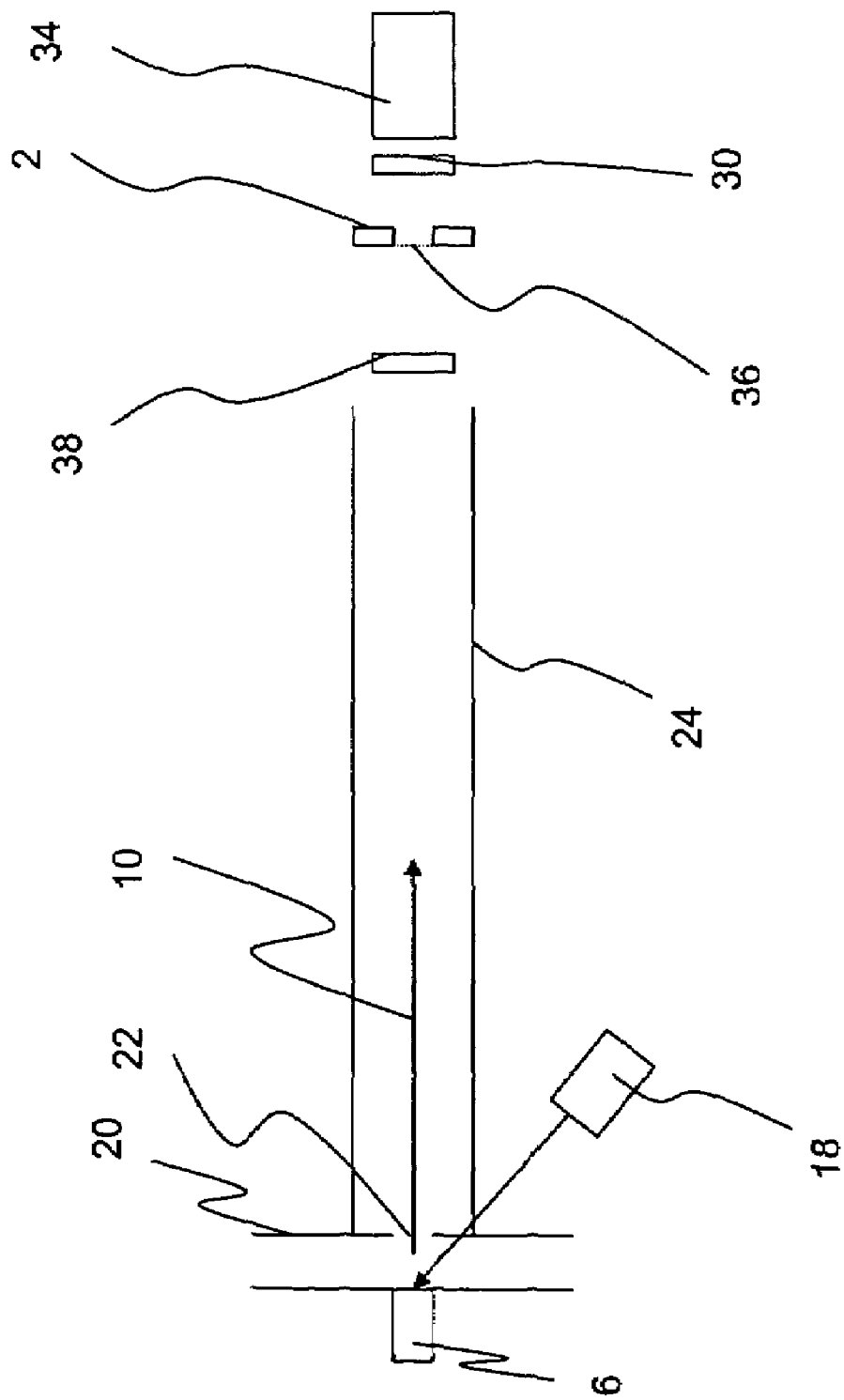
FIG. 2 is a schematic sectional view of an experimental setup of a MALDI-TOF mass spectrometer incorporating an embodiment of the particle detector according to the present invention.

FIG. 2 shows a corresponding experimental setup of a MALDI time-of-flight (MALDI-TOF) mass spectrometer in more detail. The setup includes a particle detector 1 which can be used for detecting positively charged particles as well as negatively charged particles, or even metastable neutrals, and a particle beam generating device 14 including a target 16 in form of a plate which is biased at a predetermined DC voltage, and a laser device 18 directing a laser beam onto the target 16 at an angle so as to generate the particles to be measured.

Depending on the electric polarity of the target 16, in this setup either positive ions (cations) or negative ions (anions) generated by the laser light impinging on the target 16 are accelerated by an electric field generated by the voltage applied to the target 16, which may be larger than +1 kV without upper limit (for detecting cations) or lower than −1 kV without lower limit (for detecting anions). In addition, the voltage applied to the target 16 may be a DC voltage or a pulsed voltage. A grounded electrode plate 20 with a through-hole 22 may be arranged at a certain distance from the target 16. The through-hole 22 is arranged at the same horizontal level as the target 16 so that the particles are accelerated on a horizontal path to pass the through-hole 22.

A cylindrical tube 24 which may extend in horizontal direction may be arranged adjacent to the grounded plate 20 and the through-hole 22. In this tube 24, the particles are separated according to their flight time which corresponds to their mass. The length of the tube 24 is not limited and can be selected according to the specific application.

Adjacent to the tube 24, the particle detector 1 comprises the highly negatively biased electrode plate 2 with the through-hole 6 having a diameter of about, for example, 1.0-25.0 mm. A voltage in a range of, for example, lower than −7 kV without lower limit, is applied to the electrode plate 2 which extends vertically and is preferably made of metal, and the through-hole 6 is at the same horizontal level as the target 16 and the through-hole 22 of the grounded plate 20 which allows the charged particles to approach the through-hole 6 thereby flying into the electric field generated by the negatively charged electrode plate 2.

Behind the electrode plate 2, the detection device 4 comprises a scintillator 30 which is mounted in a predetermined distance, for example 3-50 mm. All elements of the setup mentioned above are located in a sufficient vacuum to obtain proper results, for example $10^{-4}$ torr or higher. A photomultiplier tube 34 is mounted behind the scintillator 30 outside the vacuum for detecting the photons generated by the scintillator 30. Alternatively, a video camera may replace the photomultiplier tube 34. As the charged particles or even metastable neutrals approach the through-hole 6 and fly into the electric field, a signal can be detected by the photomultiplier tube 34. In another embodiment of the present invention, the scintillator 30 may be coated with a metal (e.g. aluminum), a metal alloy, a conductive organic material, or a conductive inorganic material, and generates corresponding light photons.

For some applications, it might also be useful to arrange a metal mesh 36 in the area of the through-hole 6. The mesh 36 can be easily mounted and detached and is either made of or coated by a layer of a material comprising aluminum, gold, or an alloy thereof. Moreover, it can be useful to insert a focusing device 38, for example an electrostatic lens set, into the particle beam path.

Figure 3:
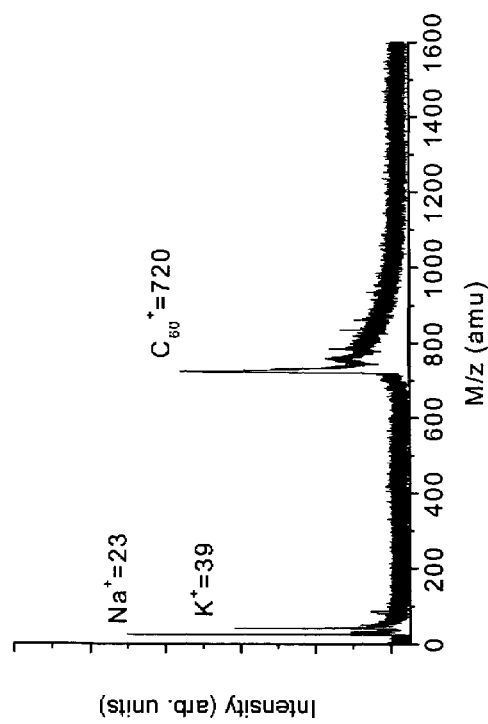
FIG. 3 is a graph showing a cationic C60 spectrum obtained by using the setup of FIG. 2 with the particle detector of FIG. 1.

FIG. 3 shows a mass spectrum of cationic C60 obtained by using the MALDI-TOF instrument of FIG. 2 including the particle detector of FIG. 1. In this embodiment, +15 kV on the target plate 16 and −20 kV on the electrode plate 2 have been used.

Figure 4:
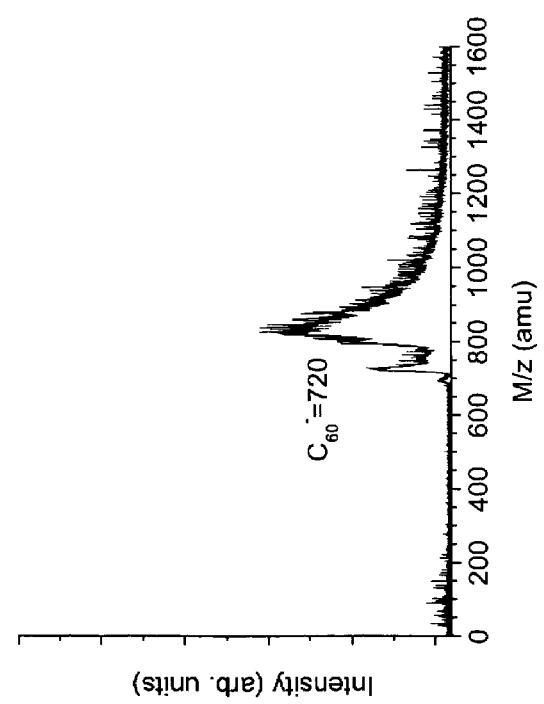
FIG. 4 is a graph showing an anionic C60 spectrum obtained by using the setup of FIG. 2 with the particle detector of FIG. 1.

FIG. 4 depicts the anionic C60 mass spectrum obtained by the same instrumental setup except that the voltage of the target plate 16 was changed to −15 kV and the voltage on the electrode plate 2 was −12.5 kV.

Because one can reduce the biased voltage on the electrode plate 2 and install it far away from the scintillator 30, it is safe to operate this particle detector under high pressure condition without the risk of getting arc on the detector.

Remarkably, this detector provides comparable sensitivity to both anion and cation detection without the change of any configuration and voltage in the detection region. This detector is the first scintillation type detector that is applicable for particles of any charge polarities.

Figure 5:
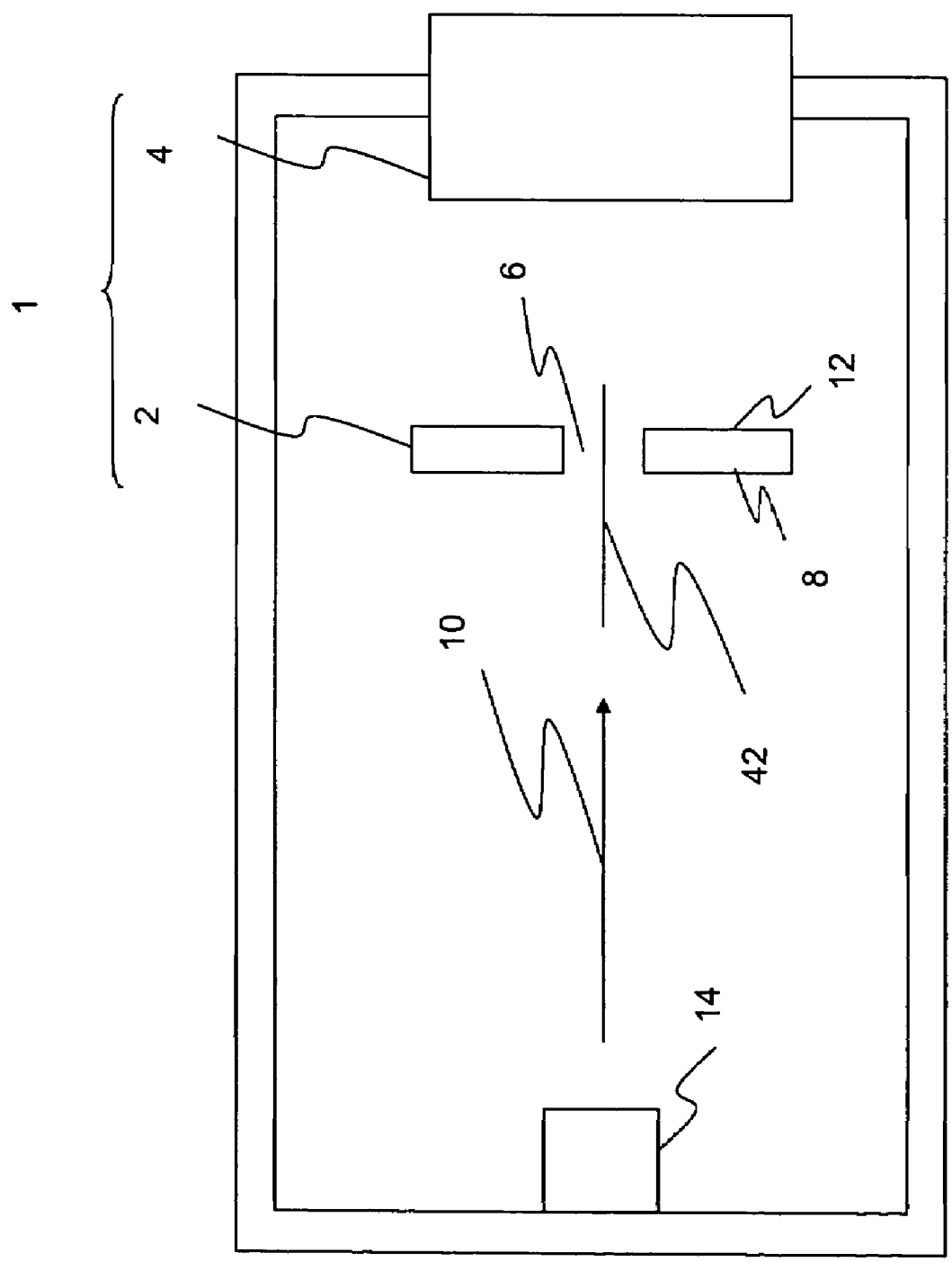
FIG. 5 is a schematic block diagram of another preferred embodiment of the particle detector according to the invention.

FIG. 5 is a schematic block diagram of another preferred embodiment of the particle detector according to the present invention. The particle detector according to this embodiment is the same as the particle detector of FIG. 1 except for an additional particle guiding device 42, which is arranged through the through-hole 6 and extends along a central axis of the particle detector in order to guide the particles of either polarity into the detection region. Preferably, the particle guiding device 42 has a potential, which may be either less negative than the negative potential of the negatively charged electrode plate 2, grounded, or slightly positive. For example, wires, rods or tubes made of electrically conducting material or electrically insulating material can be used as the particle guiding device 42. In particular, grounded stainless steel wires or tubes, glass tubes etc. can be used.

Figure 6:
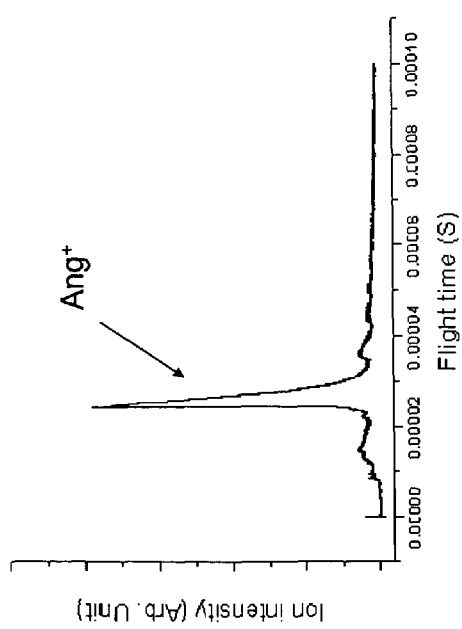
FIG. 6 is a graph showing a cationic angiotensin spectrum obtained by using the setup of FIG. 2 with the particle detector of FIG. 5.

FIG. 6 shows a mass spectrum of cationic angiotensin obtained by using this particle detector in the MALDI-TOF instrument shown in FIG. 2. In this embodiment, +15 kV on the target plate 16 and −25 kV on the electrode plate 2 and a grounded particle guiding device 42 have been used.

Figure 7:
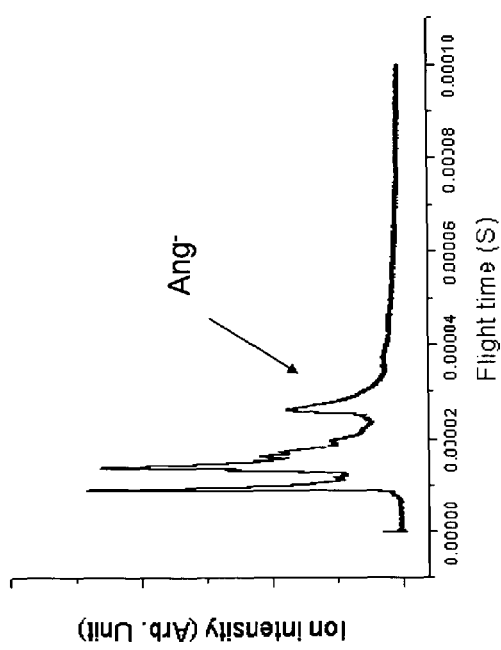
FIG. 7 is a graph showing an anionic angiotensin spectrum obtained by using the setup of FIG. 2 with the particle detector of FIG. 5.

FIG. 7 depicts the anionic angiotensin mass spectrum obtained by the same instrumental setup except that the voltage of the target plate 16 was changed to −15 kV.

The invention is not limited by the embodiments described above which are presented as examples only but can be modified in various ways within the scope of protection defined by the appended patent claims. For example, it can be considered to replace the scintillator by a microchannel plate (MCP), an electron multiplier, or an electric current collector. Further, the shape and the dimensions of the elements described above can be varied according to the requirements of specific applications.

We claim:

1. A particle detector for detecting a particle beam having at least one of negative ions and metastable neutrals without changing a configuration of the particle detector, comprising:
   a negatively charged electrode plate having a first side facing the particle beam, a second side opposite to the first side, and a through-hole extending from the first side to the second side configured to receive the particle beam having the at least one of the negative ions and metastable neutrals; and
   a detection device adjacent to the second side of the electrode plate configured to detect signals corresponding to the particle beam having the at least one of the negative ions and metastable neutrals approaching the through-hole without changing the configuration of the particle detector.

2. The particle detector of claim 1, wherein the detection device comprises a scintillator having a scintillating layer.

3. The particle detector of claim 2, wherein the detection device further comprises a photomultiplier tube or a camera for receiving the light emitted by the scintillator.

4. The particle detector of claim 2, wherein the scintillator is coated by a layer of conductive material.

5. The particle detector of claim 1, wherein the detection device comprises a microchannel plate, an electron multiplier, or an electric current collector.

6. The particle detector of claim 1, further comprising a metal mesh arranged in the area of the through-hole.

7. The particle detector of claim 1, further comprising a cylindrical, electrically grounded tube extending from a particle beam generating device towards the through-hole.

8. The particle detector of claim 1, further comprising a focusing device for focusing the particle beam.

9. The particle detector of claim 8, wherein the focusing device comprises an electrostatic lens set.

10. The particle detector of claim 1, wherein the configuration of the particle detector includes a physical and an electrical configuration of the particle detector.

11. The particle detector of claim 1, wherein the particle beam includes at least one of positive ions and negative ions, and at least metastable neutrals.

12. A particle detector for detecting a particle beam having positive and negative ions without changing a configuration of the particle detector, comprising:
   a negatively charged electrode plate having a first side facing the particle beam, a second side opposite to the first side, and a through-hole extending from the first side to the second side for receiving the particle beam having the positive and the negative ions;
   a particle guiding device which extends through the through-hole of the electrode plate; and
   a detection device adjacent to the second side of the electrode plate for detecting signals corresponding to the particle beam beam having the positive and the negative ions approaching the through-hole without changing the configuration of the particle detector.

13. The particle detector of claim 12, wherein the particle guiding device extends along a central axis of the particle detector.

14. The particle detector of claim 12, wherein the particle guiding device has a potential, a magnitude of the potential being higher than a magnitude of the negative potential of the negatively charged electrode plate.

15. The particle detector of claim 14, wherein the particle guiding device is grounded.

16. The particle detector of claim 12, wherein the particle guiding device comprises a wire, a rod or a tube.

17. The particle detector of claim 12, wherein the particle guiding device is made of an electrically conducting material or an electrically insulating material.

18. The particle detector of claim 12, wherein the configuration of the particle detector includes a physical and an electrical configuration of the particle detector.

19. The particle detector of claim 12, wherein the particle beam additionally includes at least metastable neutrals.

* * * * *

UNITED STATES PATENT AND TRADEMARK OFFICE
CERTIFICATE OF CORRECTION

PATENT NO. : 7,714,299 B2
APPLICATION NO. : 11/501142
DATED : May 11, 2010
INVENTOR(S) : Yi-Sheng Wang It is certified that error appears in the above-identified patent and that said Letters Patent is hereby corrected as shown below:

Column 6, line 20, cancel the text beginning with "12. A particle detector" to and ending "the particle detector." in column 6, line 33, and insert the following claim:

-- 12. A particle detector for detecting a particle beam having at least one of positive and negative ions without changing a configuration of the particle detector, comprising:
  a negatively charged electrode plate having a first side facing the particle beam, a second side opposite to the first side, and a through-hole extending from the first side to the second side for receiving the particle beam having the at least one of the positive and the negative ions;
  a particle guiding device which extends through the through-hole of the electrode plate; and
  a detection device adjacent to the second side of the electrode plate for detecting signals corresponding to the particle beam having the at least one of the positive and the negative ions approaching the through-hole without changing the configuration of the particle detector. --

Signed and Sealed this

Ninth Day of November, 2010

David J. Kappos
*Director of the United States Patent and Trademark Office*